(12) United States Patent
Cattan et al.

(10) Patent No.: US 6,961,330 B1
(45) Date of Patent: Nov. 1, 2005

(54) WEB DEVELOPMENT AND DEPLOYMENT USING SMS AND USSD

(75) Inventors: Ariel Cattan, Ramat Hasharon (IL); Tomer Bashan, Shoham (IL)

(73) Assignee: Comverse Ltd., Tel Aviv (IL)

( * ) Notice: Subject to any disclaimer, the term of this patent is extended or adjusted under 35 U.S.C. 154(b) by 872 days.

(21) Appl. No.: 09/599,534

(22) Filed: Jun. 23, 2000

(51) Int. Cl.[7] .................................................. H04L 12/64
(52) U.S. Cl. ............................... 370/352; 370/466
(58) Field of Search .......................... 370/310, 328, 370/389, 395.5, 465, 466, 474, 338, 352, 370/353, 355, 356, 467

(56) References Cited

U.S. PATENT DOCUMENTS

| | | | | |
|---|---|---|---|---|
| 6,122,263 | A * | 9/2000 | Dahlin et al. ............... | 370/329 |
| 6,237,033 | B1 * | 5/2001 | Doeberl et al. ............. | 709/223 |
| 6,301,661 | B1 * | 10/2001 | Shambroom ................ | 713/168 |
| 6,321,257 | B1 * | 11/2001 | Kotola et al. ............... | 709/219 |
| 6,421,707 | B1 * | 7/2002 | Miller et al. ................ | 709/206 |
| 6,487,406 | B1 * | 11/2002 | Chang et al. ............ | 455/422.1 |
| 6,549,776 | B1 * | 4/2003 | Joong .......................... | 455/433 |
| 6,611,516 | B1 * | 8/2003 | Pirkola et al. ............... | 370/352 |
| 6,826,597 | B1 * | 11/2004 | Lonnroth et al. ........... | 709/207 |
| 2001/0048686 | A1 * | 12/2001 | Takeda et al. .............. | 370/401 |
| 2003/0187926 | A1 * | 10/2003 | Karjanlahti ................. | 709/204 |

FOREIGN PATENT DOCUMENTS

| DE | 298 16 131 U1 | 2/1999 |
|---|---|---|
| WO | WO 98/47270 | 10/1998 |
| WO | WO 99/35595 | 7/1999 |
| WO | WO 99/64967 | 12/1999 |

OTHER PUBLICATIONS

"Short Message Service Center, External Interface Protocol Description", by NETology, LTD.
"SMS as a Bearer for WAP", Discussion document submitted to the WAP Forum SMS Expert Group, Miami, Apr. 2000.
Proteus Co. News Release "Changing Your Shape for the Future".
ARC Group Consulting Report.
PassCall Advanced Technologies Ltd., "Bridging the Internet and Wireless Worlds" Mar. 2000.

* cited by examiner

*Primary Examiner*—Melvin Marcelo
(74) *Attorney, Agent, or Firm*—Sughrue Mion, PLLC

(57) ABSTRACT

A communication system contains a protocol converting controller. The controller receives an upstream mobile terminal message from a mobile terminal and converts the upstream mobile terminal message into an upstream Internet message to be used by an Internet server. Also, the controller receives a downstream Internet message from the Internet server and converts the downstream Internet message into a downstream mobile terminal message to be used by the mobile terminal. In one implementation, the downstream Internet message is output by an Internet application and contains an Internet page having mobile terminal data for creating the downstream mobile terminal message. The Internet page contains potentially responsive mobile terminal messages and Internet addresses that respectively correspond to the potentially responsive mobile terminal messages.

31 Claims, 8 Drawing Sheets

| SMS Destination Addresses | URIs |
|---|---|
| SMS Dest1 | URI 1 |
| SMS Dest2 | URI 2 |
| SMS Dest3 | URI 3 |
| *** | *** |
| SMS DestN | URI N |

Fig. 4

| ID Numbers of Users in Session | Possible Responsive SMS Messages | SMS Destination Addresses | URIs |
|---|---|---|---|
| ID 1 | SMS 1 | SMS DEST1 | URI 1 |
| ID 1 | SMS 2 | SMS DEST1 | URI 2 |
| *** | *** | *** | *** |
| ID 1 | SMS A | SMS DEST1 | URI N |
| ID 2 | SMS 10 | SMS DEST2 | URI 10 |
| ID 2 | SMS 11 | SMS DEST2 | URI 11 |
| *** | *** | *** | |
| ID 2 | SMS B | SMS DEST2 | URI B |
| *** | *** | *** | *** |
| ID X | SMS 100 | SMS DESTN | URI 100 |
| ID X | SMS 101 | SMS DESTN | URI 101 |
| *** | *** | *** | *** |
| ID X | SMS C | SMS DESTN | URI C |

Fig. 5

| ID Numbers of Users in Session | URIs | HTTP cookies |
|---|---|---|
| ID 1 | URI1 | Cookie 1 |
| ID 1 | URI2 | Cookie 2 |
| *** | *** | *** |
| ID 1 | URIA | Cookie A |
| ID 2 | URI10 | Cookie 10 |
| ID 2 | URI11 | Cookie 11 |
| *** | *** | *** |
| ID 2 | URIB | Cookie B |
| *** | *** | *** |
| ID X | URI100 | Cookie 100 |
| ID X | URI101 | Cookie 101 |
| *** | *** | *** |
| ID X | URIC | Cookie C |

Fig. 6

| ID Numbers of Users in Session | Possible Responsive SMS Messages | SMS Destination Addresses | URIs |
|---|---|---|---|
| 111111 | 1 | 999999 | http://www.mobileinfo.com/news.asp |
| 111111 | 2 | 999999 | http://www.mobileinfo.com/weather.asp |
| 111111 | 3 | 999999 | http://www.mobileinfo.com/stocks.asp |
| 111111 | 4 | 999999 | http://www.mobileinfo.com/jokes.asp |
| 111111 | <default> | 999999 | http://www.mobileinfo.com/help.asp |

Fig. 8

WEB DEVELOPMENT AND DEPLOYMENT USING SMS AND USSD

FIELD OF THE INVENTION

The present invention relates to a communication system that converts a particular communication protocol to an Internet-based communication protocol and that converts the Internet-based communication protocol to the particular communication protocol. In one implementation, the system converts a communication protocol utilized by a mobile telephone to the Internet-based communication protocol, and vice versa. In addition, the present invention relates to a method performed by the communication system and a software program that performs the method.

BACKGROUND OF THE INVENTION

Recently, communication systems have been developed that enable users of mobile telephones to have limited access to various applications via the Internet. However, in order for a user to access the applications via his or her mobile telephone, the application must be designed in accordance with complex telephone communication protocols, such as a Short Message Service ("SMS") protocol or an Unstructured Supplementary Service Data ("USSD") protocol.

The SMS protocol allows a user to send and receive short alphanumeric messages (typically up to 160 characters) via his or her mobile telephone. Such a protocol was initially developed to be used in a Global System for Mobile communications ("GSM") systems, but is now also utilized in Time Division Multiple Access ("TDMA") and Code Division Multiple Access ("CDMA") communication systems. The SMS protocol allows a user to connect to a communication network on a "message-by-message" basis. For example, if a user wishes to send an SMS message to the network, a connection between the user's mobile telephone and the network is established, the SMS message is sent to the network, and the connection is terminated. Afterwards, if a reply needs to be sent from the network to the user, a connection between the user's mobile telephone and the network is established, the SMS message is sent to the telephone, and the connection is terminated.

The USSD protocol is similar to the SMS protocol, except that the USSD protocol allows a user to establish a connection to a network on a "session" basis instead of on a "message-by-message" basis. In particular, the USSD protocol creates a continuing connection between the mobile telephone and the network while multiple messages are exchanged between the telephone and the network, and the connection is terminated when the session of exchanging such messages is completed.

Various communications companies utilize the SMS and USSD protocols in their communication products. Examples of the SMS and USSD protocols are the Short Message Peer-to-Peer ("SMPP") protocol developed by Logical Aldiscon, the UCP protocol developed by CMG, the CIMD protocol developed by Nokia, and the NIP protocol developed by Comverse. The SMPP, UCP, CIMD, and NIP protocols are proprietary protocols of the respective companies identified above.

Currently, developing Internet applications that can communicate with mobile telephones is complex and time consuming. In order to better explain such complexity, an example of a typical communication system that enables a mobile telephone to communicate with one or more applications will be described conjunction with FIG. 1. As shown in the figure, the system contains a mobile terminal 10, a cellular controller 30, and a plurality of application servers 40 and 50.

The cellular controller 30 is typically an SMS Center (i.e. a controller that utilizes an SMS protocol) or a USSD Center (i.e. a controller that utilizes a USSD protocol) and communicates with the mobile terminal 10 by exchanging SMS or USSD messages with the terminal 10. (SMS or USSD messages are messages that comply with the SMS or USSD protocol). For instance, the mobile terminal 10 sends messages to a cellular network 20 via a wireless communication link 60 (e.g., via a radio frequency channel), and the network 20 forwards the messages to the controller 30 via a communication link 70. Conversely, the cellular controller 30 sends messages to the mobile terminal 10 via the network 20 and the communication links 60 and 70.

The cellular controller 30 also exchanges SMS or USSD messages with the application server 40 to access a first application stored in the server 40 and exchanges messages with the application server 50 to access a second application stored in the server 50. In particular, the controller 30 communicates with the application server 40 via a dedicated communication link 80 that connects the controller 30 and the application server 40. Similarly, the controller 30 communicates with the application server 50 via the cellular network 20 and a communication link 90 that connects the server 50 with the network 20. The cellular controller 30 accesses the first and second applications by exchanging SMS or USSD messages with the servers 40 and 50 in accordance with the SMS or USSD protocol, and thus, the first and second applications must be designed and implemented in accordance with an SMS or USSD protocol. For example, the first and second applications may be designed and implemented in accordance with one of the SMPP, UCP, CIMD, or NIP protocols mentioned above.

Based on such configuration, the mobile terminal 10 can access the first application stored in the application server 40 by sending and receiving SMS or USSD messages via the cellular network 20, the cellular controller 30, and the communication links 60, 70, and 80. Similarly, the mobile terminal 10 can access the second application stored in the application server 50 by sending and receiving SMS or USSD messages via the cellular network 20, the cellular controller 30, and the communication links 60, 70, and 90.

As described above, the first and second applications can be accessed by the mobile terminal 10 because they are specifically designed and implemented in accordance with a SMS or USSD protocol. However, designing applications based on such protocol is extremely difficult and time consuming. For example, existing Internet software programs and design tools currently do not enable programmers to design and implement Internet applications in accordance with the SMS or USSD protocol, and thus, designing such applications to communicate with the cellular controller 30 is very tedious and difficult. Furthermore, in order for the application servers 40 and 50 to communicate with multiple mobile terminals, they have to implement and utilize a complex session management scheme for handling data exchanged between the multiple terminals. Also, even though some Internet applications have been designed to communicate in accordance with the SMS or USSD protocol, most of the Internet applications are designed to operate only in accordance with an Internet protocol (e.g., the Hyper Text Transfer Protocol ("HTTP") protocol). In other words, even after a lot of effort and expense are spent to develop some applications that can be accessed by the mobile terminal 10, the mobile terminal 10 still cannot access the vast majority of Internet applications. Moreover, the vast majority of applications cannot be easily modified to communicate with the terminal 10.

In order to attempt to overcome the above problems, a cellular controller has been developed that accesses Internet applications which have been designed in accordance with an Internet protocol and which have been previously processed by an operator of the controller. Then, the controller outputs messages to mobile terminals based on the processed information from the Internet applications.

Specifically, the operator of the controller uses a typical Internet browser to manually accesses Internet applications that have been designed and implemented in accordance with a Hyper Text Markup Language ("HTML") protocol and receives one or more HTML pages from the applications. (A HTML page is a predetermined group of data that is generated by the Internet application). Then, the operator utilizes a specific program to manually identify information within the HTML pages that is capable of being extracted from the HTML pages and select some of the extractable information. After the HTML pages have been processed in such manner, the controller strips various data from the HTML pages to search for particular fields within the HTML pages and sends the data within the fields to the mobile terminal as an SMS message. For example, the controller may receive a web page that contains information about NASDAQ stocks, strip information from the web page to obtain data relating to the price quote of a particular stock, and send the price quote to the mobile terminal as an SMS message.

Although the above cellular controller can access Internet applications that utilize an HTML protocol, the controller only extracts selected information from the HTML pages that has been manually processed by the operator of the controller and selectively forwards the selected information to the mobile terminal. As a result, the type and amount of information that the mobile terminal receives is somewhat limited. In addition, a substantial amount of time is need to extract the selected information from the HTML pages, and thus, data from "real time" Internet applications cannot be forwarded the mobile terminal in an efficient manner.

In another attempt to overcome the above problems, a cellular controller has been developed that receives HTML data and outputs Wireless Markup Language ("WML") data to mobile terminals in accordance with a Wireless Application Protocol ("WAP") protocol. However, the WAP protocol is a highly specialized communication protocol, and in order to operate in accordance with the WAP protocol, a mobile terminal must be specifically designed in accordance with the protocol and must have a micro-browser installed locally within the mobile terminal. In addition, a mobile terminal that operates in accordance with the WAP protocol can only receive WML data and cannot receive SMS or USSD messages. Since only a very small percentage of mobile terminals that have been specifically designed to support the WAP protocol and receive WML data, the above system does not enable the vast majority of mobile terminals to access Internet applications that have been implemented in accordance with the HTTP protocol and does not facilitate the design of Internet applications so that they can communicate with the vast majority of mobile terminals.

In yet another attempt to overcome the above problems, the "i-mode" protocol has been developed by NTT DoCoMo and employed extensively in Japan. The i-mode protocol enables mobile terminals to communicate with Internet applications by using simplified versions of HTML messages. However, the i-mode protocol still has several disadvantages. For example, since the protocol uses simplified versions of HTML messages, each web site that needs to communicate with a mobile terminal via the i-mode protocol must be modified so that it communicates via the simplified HTML messages. Thus, since the vast majority of web sites have not been modified to communicate via such simplified messages, the number of web sites that can be accessed by the mobile terminals is very limited. Also, the data rate of the communications between the mobile terminals and the Internet applications using the i-mode protocol it is limited to about 9.6 kbps. Although such speed may be suitable for some current communication systems, it will be too slow for future communication systems (e.g., 2.5G and 3G cellular systems) that require much faster data rates. Additional information about the i-mode protocol may be found at www.nttdocomo.com.

SUMMARY OF THE INVENTION

One object of the present invention is to provide a communication system, method, and software routine that overcome the above and other disadvantages of conventional communication systems.

Another object of the present invention is to provide a communication system, method, and software routine that converts a protocol utilized by mobile terminals into an Internet protocol and vice versa.

An additional object of the present invention is to provide a communication system, method, and software routine that converts a protocol utilized by mobile terminals into an Internet protocol and vice versa and that can transfer data at high rates (e.g., in excess of 100 kbps).

A further object of the present invention is to provide a communication system, method, and software routine that converts an SMS or USSD protocol utilized by mobile terminals into an Internet protocol and vice versa.

A even further object of the present invention is to provide a communication system, method, and software routine that enables a mobile terminal that operates in accordance with a mobile terminal protocol to access Internet applications and to facilitate the design of Internet applications so that they can communicate with the mobile terminal.

A still further object of the present invention is to provide a communication system, method, and software routine that enables a mobile terminal that operates in accordance with an SMS or USSD protocol to access Internet applications and to facilitate the design of Internet applications so that they can communicate with the mobile terminal.

Another object of the present invention is to provide a communication system, method, and software routine that stores links to other web pages that may be accessed by a mobile terminal based on the web page that has been previously accessed by the mobile terminal.

Still another object of the present invention is to provide a communication system, method, and software routine that downloads and stores other web pages that may be accessed by a mobile terminal based on the web page that has been previously accessed by the mobile terminal.

Yet another object of the present invention is to provide a communication system, method, and software routine that stores cookies based on the communications between a mobile terminal and an Internet application to enhance the session management techniques used by the application.

In order to achieve the above and other objects, a communication system is provided. The communication system comprises: a protocol converting controller that receives a first upstream mobile terminal message having a mobile terminal communication protocol and converts the first upstream mobile terminal message into a first upstream Internet message having an Internet protocol.

In order to further achieve the above and other objects, a communication system is provided. The communication system comprises: a protocol converting controller that receives a first downstream Internet message having an Internet protocol and converts the first downstream Internet message into a first downstream mobile terminal message having a mobile terminal communication protocol, wherein the first downstream Internet message comprises an Internet data page having: first downstream mobile terminal message data that is used to generate the first downstream mobile terminal message; first responsive mobile terminal message data corresponding to a first responsive upstream mobile terminal message that responds to the first downstream mobile terminal message; and a first responsive Internet address that corresponds to the first responsive upstream mobile terminal message, wherein the protocol converting controller generates the first downstream mobile terminal message based on the first downstream mobile terminal message data and outputs the first downstream mobile terminal message.

In order to even further achieve the above and other objects, a communication system is provided. The communication system comprises: an Internet server that receives a first upstream Internet message having an Internet protocol, wherein the first upstream Internet message is based on a first upstream mobile terminal message having an mobile terminal communication protocol, wherein the Internet server contains an Internet application that generates a first downstream Internet message based on the first upstream Internet message, wherein the first downstream Internet message comprises an Internet data page having: first downstream mobile terminal message data that is used to generate a first downstream mobile terminal message that response to the first upstream mobile terminal data; first responsive mobile terminal message data corresponding to a first responsive upstream mobile terminal message that responds to the first downstream mobile terminal message; and a first responsive Internet address that corresponds to the first responsive upstream mobile terminal message.

In order to additionally achieve the above and other objects, a communication system is provided. The communication system comprises: a communication protocol controller that inputs an upstream mobile terminal message having a mobile terminal communication protocol, an upstream identification of a particular mobile terminal that sent the upstream mobile terminal message, and an upstream destination address corresponding to a destination of the upstream mobile terminal message; a first URI table that is coupled to the communication protocol controller, that stores first potential destination addresses, and that stores first potential URIs that respectively correspond to the first potential destination addresses; a second URI table, that is coupled to the communication protocol controller and that stores first potential identifications, second potential destination addresses, first potential mobile terminal messages that respectively correspond to the first potential identifications and the second potential destination addresses, and second potential URIs that respectively correspond to the first potential mobile terminal messages; and an Internet message generator that is coupled to the communication protocol controller and that outputs an upstream Internet message having an Internet protocol, wherein the communication protocol controller outputs the upstream identification, the upstream destination address, and the upstream mobile terminal message to the second URI table, wherein, when the upstream identification corresponds to a first selected identification of the first potential identifications, when the upstream destination address corresponds to a first selected destination address of the second potential destination addresses, and when the upstream mobile terminal message corresponds to a first selected mobile terminal message of the first potential mobile terminal messages, the second URI table outputs a first selected URI of the second potential URIs that corresponds to the first selected identification, the first selected destination address, and the first selected mobile terminal message, and the communication protocol controller outputs the first selected URI to the Internet message generator as an upstream URI, wherein, when the upstream identification does not correspond to any of the first potential identifications, the upstream destination address does not correspond to any of the second potential destination addresses, or the upstream mobile terminal message does not correspond to any of the first potential mobile terminal messages, the second URI table outputs a no match signal to the communication protocol controller, wherein, when the communication protocol controller receives the no match signal, the communication protocol controller outputs the upstream destination address to the first URI table, wherein, when the first URI table inputs the upstream destination address, the first URI table identifies a second selected destination address of the first potential destination addresses that corresponds to the upstream destination address, and outputs a second selected URI of the first potential URIs that corresponds to the second selected destination address, wherein, when the first URI table outputs the second selected URI, the communication protocol controller outputs the second selected URI to the Internet message generator as the upstream URI, and wherein the Internet message generator outputs the upstream Internet message based on the upstream URI.

In order to even additionally achieve the above and other objects, a communication method is provided. The method comprises: (a) receiving a first upstream mobile terminal message having a mobile terminal communication protocol; and (b) converting the first upstream mobile terminal message into a first upstream Internet message having an Internet protocol.

In order to still further achieve the above and other objects, a communication method is provided. The method comprises: (a) receiving a first upstream Internet message having an Internet protocol, wherein the first upstream Internet message is based on a first upstream mobile terminal message having an mobile terminal communication protocol, (b) generating a first downstream Internet message based on the first upstream Internet message, wherein the first downstream Internet message comprises an Internet data page having: first downstream mobile terminal message data that is used to generate a first downstream mobile terminal message that response to the first upstream mobile terminal data; first responsive mobile terminal message data corresponding to a first responsive upstream mobile terminal message that responds to the first downstream mobile terminal message; and a first responsive Internet address that corresponds to the first responsive upstream mobile terminal message.

In order to yet still further achieve the above and other objects, a software program contained in a computer readable medium is provided. The software program instructs a communication system to perform a routine, comprising: (a) receiving a first upstream mobile terminal message having a mobile terminal communication protocol; and (b) converting the first upstream mobile terminal message into a first upstream Internet message having an Internet protocol.

In order to additionally achieve the above and other objects, a software program contained in a computer readable medium is provided. The software program instructs a communication system to perform a routine, comprising: (a) receiving a first downstream Internet message having an Internet protocol; (b) converting the first downstream Internet message into a first downstream mobile terminal message having a mobile terminal communication protocol, wherein the first downstream Internet message comprises an Internet data page having: first downstream mobile terminal message data that is used to generate the first downstream mobile terminal message; first responsive mobile terminal message data corresponding to a first responsive upstream mobile terminal message that responds to the first downstream mobile terminal message; and a first responsive Internet address that corresponds to the first responsive upstream mobile terminal message, wherein the first downstream mobile terminal message is generated based on the first downstream mobile terminal message data; and (c) outputting the first downstream mobile terminal message.

In order to yet additionally achieve the above and other objects, a software program contained in a computer readable medium is provided. The software program instructs a communication system to perform a routine, comprising: (a) receiving a first upstream Internet message having an Internet protocol, wherein the first upstream Internet message is based on a first upstream mobile terminal message having an mobile terminal communication protocol, (b) generating a first downstream Internet message based on the first upstream Internet message, wherein the first downstream Internet message comprises an Internet data page having: first downstream mobile terminal message data that is used to generate a first downstream mobile terminal message that response to the first upstream mobile terminal data; first responsive mobile terminal message data corresponding to a first responsive upstream mobile terminal message that responds to the first downstream mobile terminal message; and a first responsive Internet address that corresponds to the first responsive upstream mobile terminal message.

BRIEF DESCRIPTION OF THE DRAWINGS

The above and other objects and advantages of the present invention will become more apparent by describing in detail preferred embodiments thereof with reference to the attached drawings in which:

FIG. 4 shows an illustrative example of data that is stored in the SMS-code-to-URI table shown in FIG. 3;

FIG. 5 shows an illustrative example of data that is stored in the session resolution table shown in FIG. 3;

FIG. 6 shows an illustrative example of data that is stored in the cookies table shown in FIG. 3;

FIG. 8 shows an illustrative detailed example of data that is stored in the session resolution table shown in FIG. 3.

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

The present invention relates to a communication system, method and software program that can quickly and easily convert data generated by an Internet application implemented in accordance with an Internet protocol into data that can be read by a mobile terminal that operates in accordance with a standard mobile terminal protocol. In addition, the software program may be stored via a read only memory ("ROM"), a random access memory ("RAM"), a floppy disk, a hard disk, an optical disk, a carrier wave (e.g. a carrier wave transmitted via the internet, a vertical blanking interval of a television signal, etc.), or any other computer readable medium.

Figure 1:
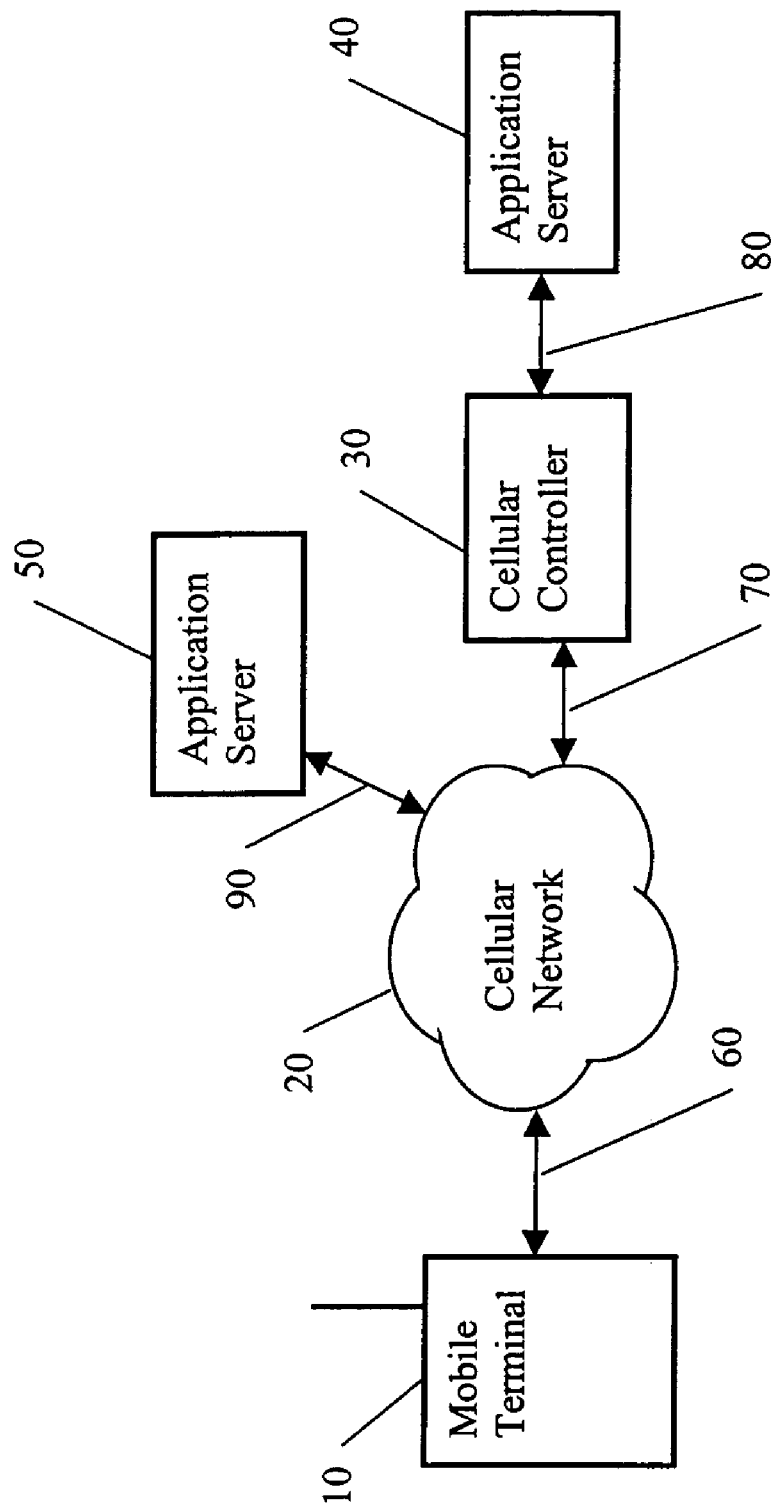
FIG. 1 shows a conventional communication system in which a mobile terminal can communicate with an application server.
Figure 2:
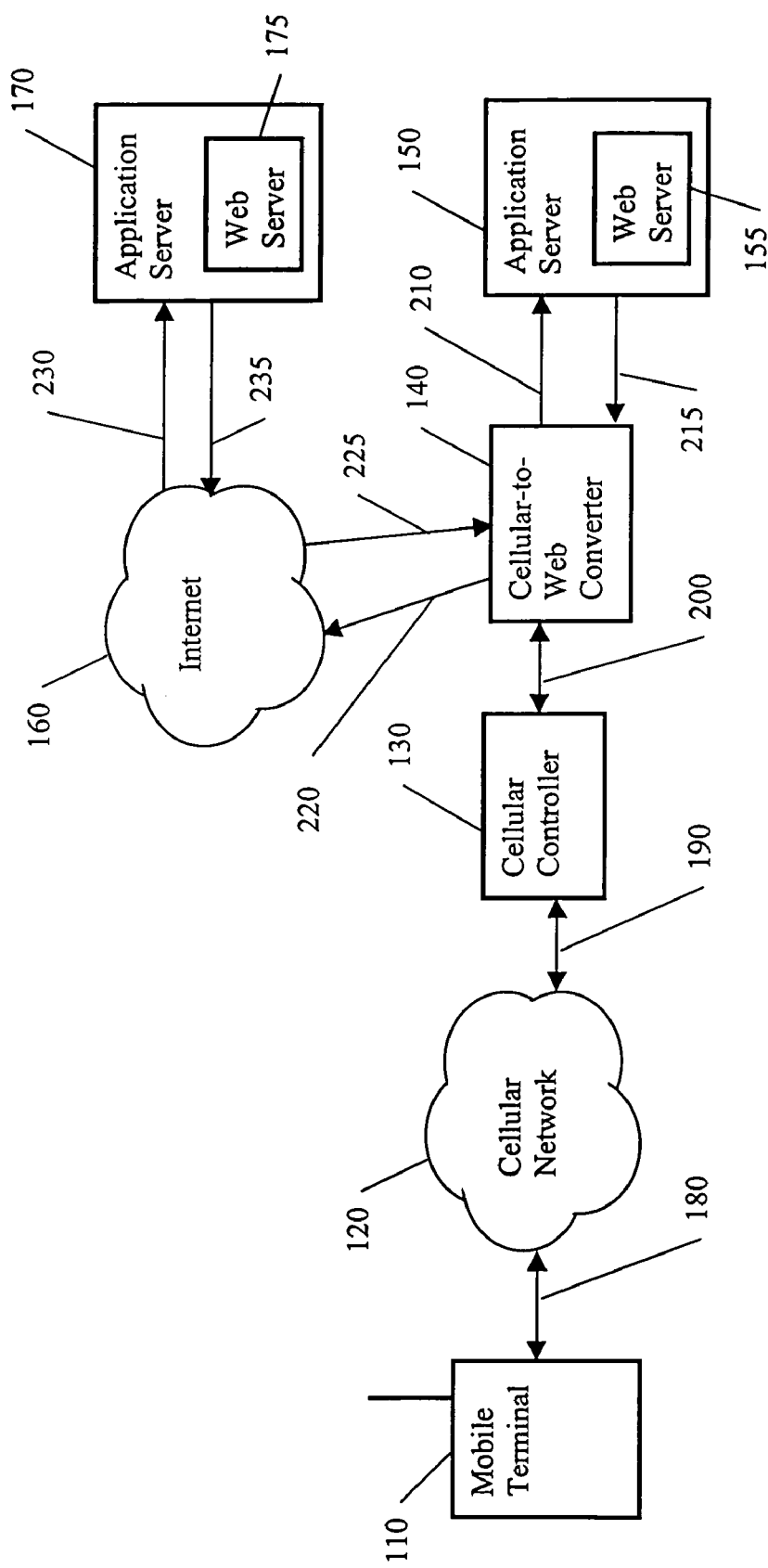
FIG. 2 shows a communication system in accordance with an illustrative embodiment of the present invention.

In an illustrative, non-limiting embodiment of the present invention, a communication system has been developed that enables mobile terminals (e.g., mobile telephones), which send and receive data in accordance with a standard mobile terminal protocol (e.g., the SMS or USSD protocol), to communicate with an Internet application that is implemented in accordance with an Internet protocol (e.g., the HTTP, Extensible Markup Language ("XML"), or HTML protocol). An example of the illustrative embodiment is shown in FIG. 2.

As shown in the figure, the system contains a mobile terminal 110, a cellular controller 130, a Cellular-to-Web ("CTW") converter 140, and a plurality of application servers 150 and 170. The cellular controller 130 may be an SMS Center or a USSD Center and may communicate with the mobile terminal 110 by exchanging SMS or USSD messages with the terminal 110. In such a scenario, the mobile terminal 110 sends SMS or USSD messages to a cellular network 120 via a wireless communication link 180, and the network 120 forwards the messages to the controller 130 via a communication link 190. In addition, the cellular controller 130 sends messages to the mobile terminal 110 via the network 120 and the communication links 180 and 190.

The cellular controller 130 may also supply the SMS or USSD messages to the CTW converter 140 via the communication link 200. The CTW converter 140 may be a Short Message ("SM")-to-Web converter that translates the SMS or USSD messages from the cellular controller 130 into messages that comply with an Internet protocol (e.g., an HTTP, XML, or HTML protocol). For example, the CTW converter 140 may convert SMS or USSD messages into HTTP requests 210 and 220.

The CTW converter 140 communicates with the application server 150 by outputting an HTTP request 210 to the application server 150, and the request 210 accesses a web server 155 within the application server 150. When the web server 155 is accessed, a back-end web server is activated, generates a HTTP response 215 to the HTTP request 210, and supplies the response 215 to the converter 140. Various back-end web server technologies (e.g., Common Gateway Interface ("CGI") technology, Active Server Pages ("ASP") technology, Java Server Pages ("JSP") technology, etc.) may be used within the back-end server to generate the response 215. In addition, the HTTP response 215 may include an XML page.

Also, the CTW converter 140 communicates with the application server 170 by outputting an HTTP request 220 to the Internet 160, and the Internet outputs a corresponding HTTP request 230 to the application server 170. The application server 170 and a web server 175 within the server 170 process the request 230 in a manner that is similar to the manner in which the servers 150 and 155 process the request 210. Accordingly, the application server 170 generates a corresponding HTTP response 235 (that may include an XML page) and supplies it to the Internet 160. Then, the Internet 160 supplies a corresponding HTTP response 225 to the CTW converter 140.

After the CTW converter 140 receives the HTTP response 215 and/or the HTTP response 225, it converts the response 215 and/or the response 225 into one or more SMS or USSD messages. Then, the SMS or USSD messages are supplied to the cellular controller 130 via the communication link 200, and controller 130 outputs the messages to the mobile terminal 110 via the cellular network 120 and the communication links 180 and 190.

In the embodiment shown in FIG. 2, the cellular controller 130 and the CTW converter 140 are depicted as being two separate controllers that execute two different software programs. However, the present embodiment is clearly not limited to such a configuration. For example, the converter 140 can be incorporated within the cellular controller 130 such that a single controller executes a single software program that performs the functions of both the cellular controller 130 and the CTW converter 140.

Figure 3:
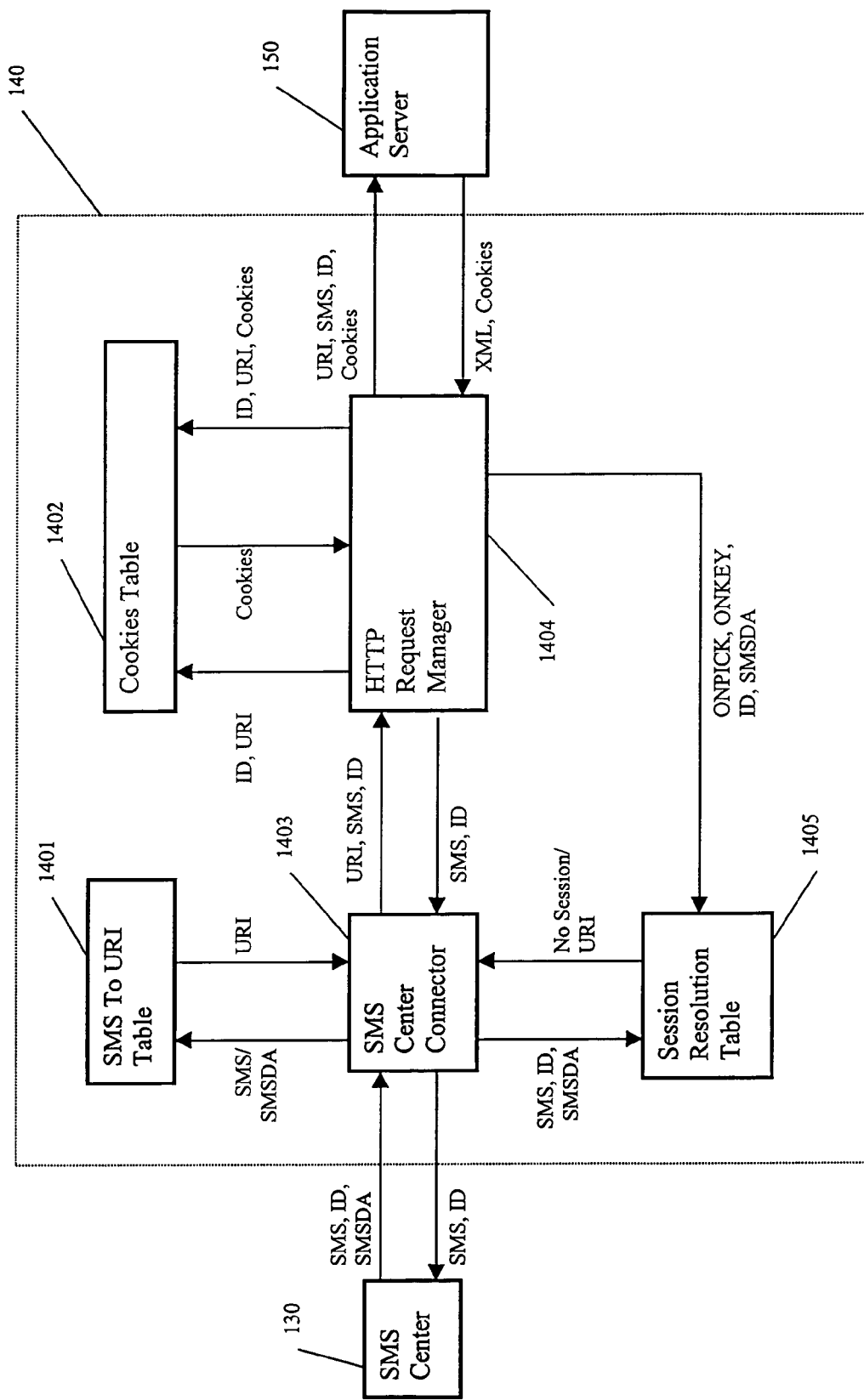
FIG. 3 shows a illustrative example of the detailed structure of the cellular-to-web converter shown in FIG. 2.

A detailed example of the structure of the CTW converter 140 is illustrated in FIG. 3. Furthermore, the CTW converter 140 may be implemented via software, hardware, or a combination of hardware and software. Also, in the illustrative example shown in the figure, the controller 130 (FIG. 2) corresponds to an SMS center 130 (FIG. 3), and the CTW converter 140 is configured to interact with the SMS center 130. However, the CTW converter 140 may have a different configuration if it interacts with a different type of controller 130 and/or other devices.

In any event, in the non-limiting example shown in FIG. 3, the CTW converter 140 comprises an SMS-To-Uniform Resource Identifier ("SMS/URI") table 1401, a cookies table 1402, a SMS center connector 1403, an HTTP request manager 1404, and a session resolution table 1405. The SMS center connector 1403 inputs the SMS messages from the SMS center 130 and outputs SMS messages to the SMS center 130.

The SMS/URI table 1401 stores a Uniform Resource Identifier ("URI") that corresponds to each SMS message that may be received from the SMS center 130 when a user initially desires to access an application stored in the application server 150. In one implementation, each SMS message contains or is associated with an SMS destination address that identifies the application (and/or application server) to which the SMS message is sent. In a further implementation, an SMS destination address of an Internet application is the address to which all of the SMS messages (that are addressed to such application) are sent. For example, the destination address may be a destination telephone number of the application server (or the cellular controller) to which the SMS message is sent. In a GSM system, the destination address may correspond to an Mobile Station Integrated Services Digital Network ("MSISDN") number, and in a TDMA/CDMA system the destination address may correspond to a Mobile Identification Number ("MIN").

The table 1401 stores all of the possible SMS destination addresses and the URIs that respectively relate to the SMS destination addresses such that each URI is associated with a corresponding SMS destination address. In other words, the table 1401 may be considered to be a "look up table" that associates each SMS destination address with a URI, and an illustrative embodiment of the SMS/URI table 1401 is shown in FIG. 4. In one implementation of the embodiment, the various URIs that are associated with the SMS destination addresses are determined by the designer of the CTW converter 140. In another embodiment, the SMS/URI table 1401 is a "look up table" that stores all of the possible SMS messages and URIs corresponding to the SMS messages and that respectively associates all of the possible SMS messages with the URIs.

The session resolution table 1405 stores data relating to each user that is currently using the CTW converter 140 to communicate with one of the application servers connected to the converter 140 (e.g., the application server 150). In particular, when a user is currently interacting with an application stored on the server 150 (i.e. is "in session" with the application), the user outputs a command to the CTW converter 140 via the SMS center 130. Then, as described in more detail below, the converter 140 outputs an HTTP request to the server 150, and the application causes the server 150 to output an appropriate HTTP response to CTW converter 140 based on the HTTP request. The HTTP response identifies a finite number of possible responsive SMS messages that the user may create in response to the HTTP response. The session resolution table 1405 stores the possible response SMS messages and the URIs respectively relating to each of the possible responsive SMS messages for each user that is currently in session with an application stored on the application server 150. In addition, if the SMS destination address of each SMS message is not actually contained in the SMS message, the session resolution table 1405 may also store the SMS destination addresses corresponding to the possible responsive SMS messages.

In one implementation of the embodiment, the session resolution table 1405 is a "look up table" that (1) identifies the possible responsive SMS messages that may be generated by each user in session with an Internet application, (2) identifies the SMS destination addresses that respectively correspond to the possible responsive SMS messages, and (2) identifies the URIs that respectively correspond to the possible responsive SMS messages. An example of such a "look up table" is shown in FIG. 5.

In addition, as shown in FIG. 3, the SMS/URI table 1401 and the session resolution table 1405 are illustrated as two separate tables. However, such tables 1401 and 1405 may be combined into a single table. Also, the SMS/URI table 1401 and session resolution table 1405 may be located within the same device (e.g. a Random Access memory "RAM") or within separate memory devices.

The cookies table 1402 stores the HTTP cookies received from the application server 150 for each of the users that are currently in session with the application stored on the server 150 and the URIs that respectively correspond to the cookies. In one implementation, the table 1402 is a "look up table" that identifies each user that is currently in session with the application and lists all of the cookies corresponding to the URIs that need to be called during each user's session. An example of the "look up table" is shown in FIG. 6.

The HTTP request manager 1404 sends HTTP requests to the application server 150 based on the output from the SMS center connector 1403 and other data. Also, the HTTP request manager 1404 receives HTTP responses from the server 150 and processes such responses.

A more detailed example of the operation of the CTW converter 140 shown in FIG. 3 is described below. First, the SMS center connector 1403 waits until an SMS message is output from the SMS center 130. Upon receiving the message, the connector 1403 determines the identification ("ID") of the mobile terminal that sent the SMS message and determines the SMS destination address of the SMS message. In one implementation, the mobile terminal is a mobile telephone, and the ID corresponds to the telephone number of the telephone. Also, the ID may be included in the header or some other portion of the SMS message, or it may be transmitted as a separate message concurrently with the SMS message. Also, as described above, the SMS destination address may be included in the header or some other portion of the SMS message, or it may be transmitted as a separate message concurrently with the SMS message.

Afterwards, the SMS center connector 1403 supplies the SMS message, the ID, and the SMS destination address to the session resolution table 1405 to determine if the mobile terminal and the SMS message are currently involved in a session with an application stored on the server 150. For example, if the ID, the SMS message, and the SMS destination address received by the SMS center connector 1403 are not contained in the table 1405, the mobile terminal and the SMS message are not currently involved in a session with the application stored in the server 150. In such a case, the session resolution table 1405 outputs a "No Session" signal to the SMS center connector 1403 to inform the connector 1403 that the mobile terminal and the SMS message are not currently involved in a session.

When the SMS center connector 1403 receives the "No Session" signal, the connector 1403 outputs the SMS destination address to the SMS/URI table 1401 to determine the URI that corresponds to the SMS message. For example, if the SMS destination address equals SMS DEST1, the connector 1403 outputs the SMS destination address SMS DEST1 to the table 1401. As shown in FIG. 4, the URI1 corresponds to the address SMS DEST1, and thus, the table 1401 outputs the URI1 to the connector 1403 in response to the address SMS DEST1.

When the SMS center connector 1403 receives the appropriate URI from the SMS/URI table 1401, it sends the URI, the SMS message, and the ID to the HTTP request manager 1404. When the HTTP request manager 1404 receives such information, it sends the ID and the URI to the cookies table 1402 to determine if cookies have been previously stored in the cookies table 1402 that correspond to the ID and the URI (i.e. that correspond to the mobile terminal currently accessing the application in the server 150). For example, if the ID equals ID1 and the URI equals URI2, the cookies table 1402 indicates that the cookie Cookie2 corresponds to the ID and URI. (FIG. 6). In such case, the cookie Cookie2 is supplied to the HTTP request manager 1404 in response to the ID. On the other hand, if no cookies correspond to the ID and URI, the table 1402 does not output any cookies to the manager 1404.

After determining whether or not any cookies correspond to the ID and URI, the HTTP request manager 1404 generates an HTTP request and outputs it to the application server 150. The HTTP request comprises the URI, SMS message, and ID received from the SMS center connector 1403 and any cookies received from the cookies table 1402. After the HTTP request is sent to the server 150, the HTTP request manager 1404 waits to receive a corresponding HTTP response from the application server 150 in reply to the request.

When the application server 150 receives the HTTP request, the application generates an HTTP response based on the request. In one embodiment, the HTTP response comprises XML data and any relevant cookies. Then, the HTTP response is output to the HTTP request manager 1404.

Upon receiving the HTTP response, the HTTP request manager 1404 extract the new cookies (if any) and the new URIs corresponding to the new cookies (if any) from the request and sends the cookies and URIs to the cookies table 1402. Also, if any cookies are received, the HTTP request manager 1404 sends the ID of the mobile terminal to which the HTTP response is addressed to the table 1402. Then, the cookies table 1402 stores the ID, cookies, and URIs in the manner shown in FIG. 6. In addition, the manager 1404 examines the OPTION tags contained in the XML data and extracts the ONPICK attributes and the ONKEY attributes from the OPTION tags. The ONKEY attributes correspond to the various possible SMS messages that the user may create in response to the HTTP response, and the ONPICK attributes correspond to the URIs respectively relating to the possible SMS messages. Once the possible SMS messages and corresponding URIs are identified, they are stored in the session resolution table 1405, along with the ID of the mobile terminal that caused the HTTP response to be generated and the SMS destination address of the application (and/or application server 150). The ID, SMS messages, SMS destination address, and URIs may be stored in the table 1405 in the format shown in FIG. 5 and may replace any previous SMS messages and URIs that were previously stored with respect to the ID of the mobile terminal and the SMS destination address of the application (and/or server 150).

After the relevant data is stored in the session resolution table 1405, the HTTP request manager 1404 examines the XML data in the HTTP response and extracts the SMS message that should be forwarded to the mobile terminal from the XML data. As described in more detail below, the SMS message is part of the actual XML data and is identified by the XML data with an appropriate tag. As a result, extracting the SMS message is extremely easy and does not require a substantial amount of time. After extracting the SMS message, the HTTP request manager 1404 outputs the SMS message and the ID of the mobile terminal that is intended to receive the SMS message to the SMS center connector 1403, and the connector 1403 forwards the SMS message and ID to the SMS center 130. Upon receiving the SMS message and ID, the SMS center 130 forwards the SMS message to the mobile terminal identified by the ID.

In the example above, when the SMS center connector 1403 initially receives the SMS message, SMS destination address, and the ID from the SMS center 130, the SMS message and mobile terminal are not currently involved in a session with the application stored on the server 150. Therefore, when the SMS center connector 1403 outputs the SMS message, SMS destination address, and ID to the session resolution table 1405, the table 1405 responds by outputting the "No Session" signal to the connector 1403. However, if the mobile terminal and the SMS message are currently in session with an application, the session resolution table 1405 outputs an URI to be used during the session.

For example, if the SMS center connector 1403 receives an ID that equals ID2, receives an SMS message that equals SMS11, and receives an SMS destination address that equals SMS DEST2, the connector 1403 outputs the ID2, the message SMS11, and the address SMS DEST2 to the session resolution table 1405. As shown in FIG. 5, the ID2, the message SMS11, and the address SMS DEST2 are contained in the table 1405, and thus, the mobile terminal and the SMS message are currently involved in a session with the application. Also, the table 1405 indicates that the URI corresponding to the message SMS11 and address SMS DEST2 equals URI11. As a result, the table 1405 outputs the URI11 to the SMS center connector 1403. After the connector 1403 receives the URI11, it outputs the URI11, the SMS message, and the ID to the HTTP request manager 1404, and the remaining portions of the CTW converter 140 operate in the manner described above. On the other hand, as mentioned above, if the ID2 and the address SMS DEST2 are not contained in the table 1405, the table outputs a "No Session" signal to the connector 1403.

Figure 7:
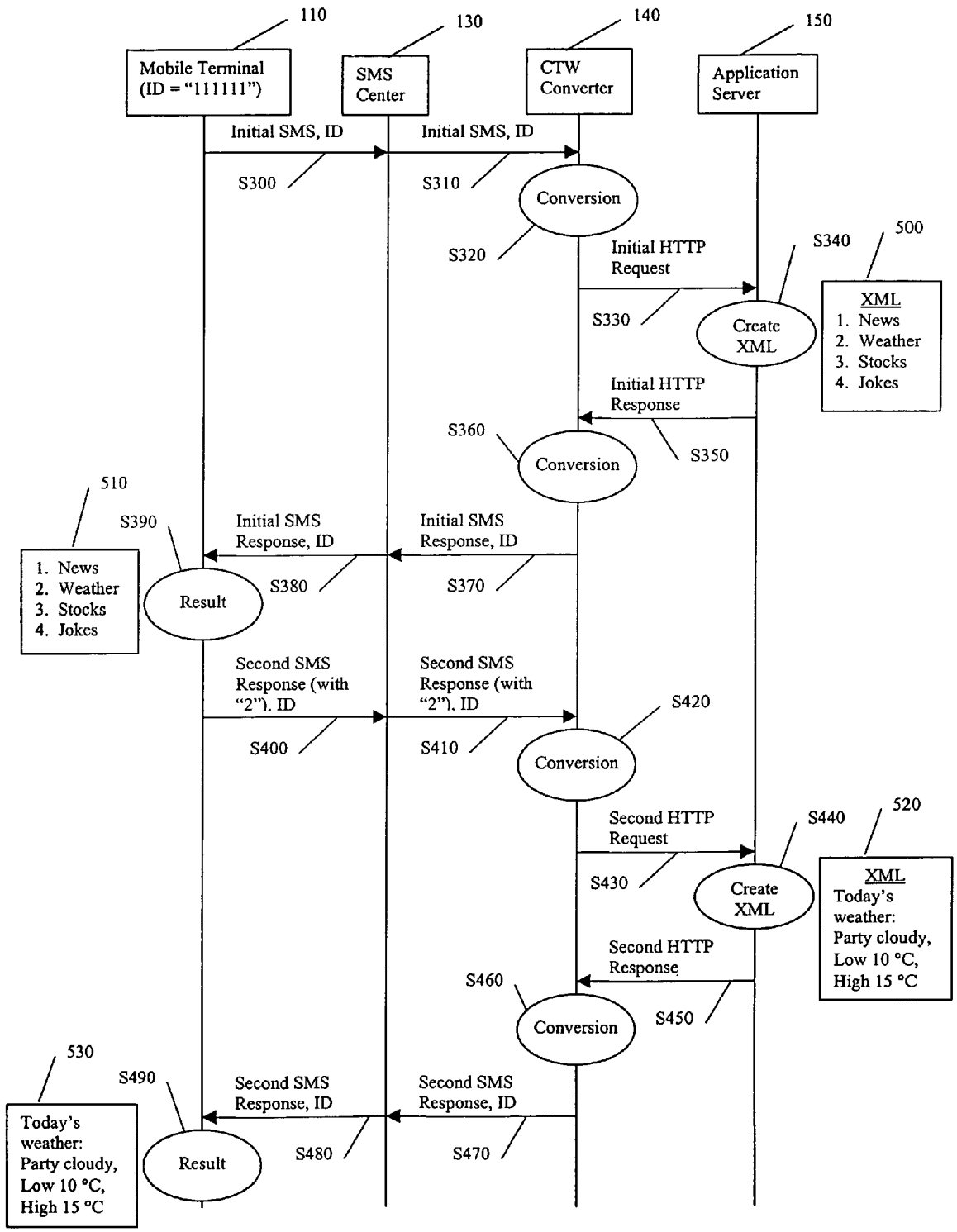
FIG. 7 shows an illustrative example of the process flow of data communications transferred over the communication system shown in FIG. 2.

A specific example of the communication between the mobile terminal 110 and the application server 150 will be described below in conjunction with FIGS. 2, 3, and 7. As shown in FIG. 7, which illustrates the flow of information among the various devices shown in FIG. 2, a user can initiate a session with an application stored on the application server 150 by inputting a particular command or destination address via the mobile terminal 110. For example, the user may input a MAIN MENU command via the mobile terminal 110 by pressing a particular button on the mobile terminal 110 or by pressing certain keys in a predetermined order. Additionally or alternatively, the user may input the MAIN MENU command by speaking a certain word or words into the mobile terminal 110 and having the mobile terminal 110 recognize the command via voice recognition techniques.

Once the user inputs the particular command or destination address, the mobile terminal 110 outputs an initial SMS message and the ID of the mobile terminal 110 to the SMS center 130 (step S300). Also, in the present example, the ID equals "111111", which may or may not correspond to the telephone number of the mobile terminal. When the SMS center 130 receives the initial SMS message and the ID, it determines the SMS destination address (e.g., "999999") of the application and forwards the SMS message, SMS destination address, and ID to the CTW converter 140 (step S310). Alternatively, the mobile terminal 110 may output the SMS destination address to the SMS center 130, and the center 130 does not determined the SMS destination address.

The CTW converter 140 receives the initial SMS message, SMS destination address, and ID and converts the SMS message into an initial HTTP request (step S320). Specifically, the converter 140 inputs the initial SMS message, SMS destination address, and ID via the SMS center connector 1403, and the connector 1403 outputs the SMS message, SMS destination address, and the ID to the session resolution table 1405. Since the mobile terminal 110 (having an ID equaling "111111") is not currently involved in a session with an application in the application server 150 (or with an application in any other server), the session resolution table 1405 outputs a "No Session" signal to the SMS center converter 1403. As a result, the SMS center converter 1403 outputs the SMS destination address (or the initial SMS message) to the SMS/URI table 1401, and the table 1401 outputs a corresponding URI to the SMS center connector 1403 based on the SMS destination address (or the initial SMS message). For example, the SMS/URI table 1401 may output the following URI to the connector 1403:
http://www.mobileinfo.com/default.asp Upon receiving the URI, the SMS center connector 1403 outputs the URI, initial SMS message, and ID to the HTTP request manager 1404. The manager 1404 then outputs the ID and URI to the cookies table 1402 to determine if any cookies are needed for the mobile terminal 110 having the ID equaling "111111" and for the URI equaling "http://www.mobileinfo.com/default.asp" to access the application in the server 150. If any cookies are required, the cookies table 1402 outputs the cookies to the HTTP request manager 1404. Then, the HTTP request manager 1404 forms an initial HTTP request comprising the URI, the initial SMS message, the ID of the mobile terminal 110, and any necessary cookies. An example of the initial HTTP request may be as follows:
http://www.mobileinfo.com/
default.asp?mobilenum=111111&text=

In the above example, the "URI portion" of the HTTP request equals "http://www.mobileinfo.com/default.asp", the "ID portion" of the HTTP request equals "mobilenum=111111", and the "SMS message portion" of the HTTP request equals "text=". As noted in the above example, the "SMS message portion" of the HTTP request does not contain any SMS message text.

After the HTTP request is formed, the HTTP request manager 1404 supplies it to the application server 150 (step S330), and the application within the server 150 creates an XML page 500 in response to the HTTP request (step S340). Specifically, the initial HTTP request instructs the application server 150 to execute the Active Server Pages ("ASP") script "default.asp" to generate the XML page 500 that contains the SMS message that needs to be send back to the mobile terminal 110 having the ID equaling "111111". The following is an example of the XML page 500:
<?xml version="1.0"?>
<SMS>
1. News<BR/>
2. Weather<BR/>
3. Stocks<BR/>
4. Jokes<BR/>
<OPTION ONKEY="1" ONPICK=http://www.mobileinfo.com/news.asp>
<OPTION ONKEY="2" ONPICK=http://www.mobileinfo.com/weather.asp>
<OPTION ONKEY="3" ONPICK=http://www.mobileinfo.com/stocks.asp>
<OPTION ONKEY="4" ONPICK=http://www.mobileinfo.com/jokes.asp>
<OPTION ONDEFAULT=http://www.mobileinfo.com/help.asp>
</SMS>

As shown above, the SMS message is part of the XML page 500 and is identified by the tag <SMS>. Also, the SMS message comprises a menu indicating that a "1" corresponds to a "News" menu option, a "2" corresponds to a "Weather" menu option, a "3" corresponds to a "Stocks" menu option, and a "4" corresponds to a "Jokes" menu option. Also, the OPTION tags indicate that ONKEY attributes indicate that the user of the mobile terminal 110 can respond to the SMS message with one of the following SMS messages: "1", "2", "3", or "4". Also, the ONPICK attributes indicate that the URI "http://www.mobileinfo.com/news.asp" corresponds to the SMS message "1", the URI "http://www.mobileinfo.com/weather.asp" corresponds to the SMS message "2", the URI "http://www.mobileinfo.com/stocks.asp" corresponds to the SMS message "3", and the URI "http://www.mobileinfo.com/jokes.asp" corresponds to the SMS message "4". After the XML page 500 is created, the application server 150 generates an initial HTTP response comprising the XML page 500 and any necessary cookies and outputs the HTTP response to the CTW converter 140 (step S350).

The CTW converter 140 receives the HTTP response via the HTTP request manager 1404 and converts the initial HTTP response into an initial SMS response (step S360). Specifically, the HTTP request manager 1404 extracts any cookies from the HTTP response. Then, the manager 1404 supplies the cookies, the ID of the mobile terminal 110 (i.e. "111111"), and the URIs corresponding to the cookies to the cookies table 1402, and the table 1402 stores the cookies such that they can be referenced based on the ID equaling "111111" and their respective URIs. In addition, the HTTP manager 1404 extracts the ONKEY attributes, the ONPICK attributes, and the ID of the mobile terminal 110 and supplies such information to the session resolution table 1405, along with the SMS destination address of the application. Then, the table 1405 stores the information such that each of the ONPICK attributes (i.e. the URIs) is associated with its corresponding ONKEY attribute (i.e. the corresponding SMS message), and each of the ONKEY attributes is associated with the ID of the mobile terminal 110 (i.e. "111111") and the SMS destination address of the application (i.e. "999999"). FIG. 5 is a generic example of the session resolution table 1405, and FIG. 8 is a more detailed example of the table 1405 and demonstrates how the information is stored in the table 1405. Also, as shown in FIG. 8, the SMS message "<default>" corresponds to any message that is sent from the mobile terminal 110 and does not equal the SMS message "1", "2", "3", or "4".

In addition, the HTTP request manager 1404 outputs the SMS message from the XML page 500 and the ID of the mobile terminal 110 to the SMS center connector 1403. Then, the connector 1403 forwards such information to the SMS center 130 (step S370), and the SMS center 130 forwards the information to the mobile terminal 110 (step S380).

After the mobile terminal 110 receives the SMS message, it displays the SMS message on a display of the mobile terminal 110 as a menu 510 (step S390). When the user views the menu 510 on the display, he or she can select one of the options from the menu 510. For example, in the illustrative, non-limiting embodiment, the user may select the "Weather" option from the menu by pressing a "2" button on the mobile terminal 110. Furthermore, in another implementation, the user may press a different button or series of buttons to select the "Weather" option or may speak a certain word or words into the mobile terminal 110 and have the "Weather" option selected via voice recognition techniques.

In any event, after the "Weather" option is selected, the mobile terminal 110 generates a second SMS message indicating that the "Weather" option was selected (e.g., generates a second SMS message containing a "2"). Then, the mobile terminal 110 sends the second SMS message, the ID of the mobile terminal 110 (i.e. "111111"), and the SMS destination address of the application (i.e. "999999") to the SMS center 130 (step S400), and the SMS center 130 forwards such information to the CTW converter 140 (step S410).

The CTW converter 140 inputs the second SMS message, the ID of the mobile terminal 110, and the SMS destination address via the SMS center connector 1403 and converts the SMS message into a second HTTP request (step S420). Specifically, the connector 1403 outputs the ID, the second SMS message, and the SMS destination address to the session resolution table 1405. As shown in FIG. 8, the ID "111111", the SMS message containing a "2", and the SMS destination address "999999" correspond to the URI "http://www.mobileinfo.com/weather.asp". As a result, the table 1405 outputs the URI "http://www.mobileinfo.com/weather.asp" to the SMS center connector 1403, and the connector 1403 outputs the URI "http://www.mobileinfo.com/weather.asp", the SMS message "2", and the ID "111111" to the HTTP request manager 1404. Then, the HTTP request manager 1404 generates the second HTTP request in a manner that is similar to the manner in which the initial HTTP request was generated. An example of the second HTTP request is as follows:

http://www.mobileinfo.com/weather.asp?mobilenum=111111&text=2

In the above example, the "URI portion" of the HTTP request equals "http://www.mobileinfo.com/weather.asp", the "ID portion" of the HTTP request equals "mobilenum=111111", and the "SMS message portion" of the HTTP request equals "&text=2". As in the previous case, the HTTP request manager 1404 sends the second HTTP request to the application server 150 (step S430). In addition, the cookie that was stored in the cookies table 1402 after the initial HTTP response was received by the manager 1404 may also be output to the server 150.

When the server 50 receives the second HTTP request (with or without the stored cookie), the application within the server 150 generates an XML page 520 (step S440). Specifically, the second HTTP request instructs the application server 150 to execute the ASP script "weather.asp" to generate the XML page 520 that contains the SMS message that needs to be send back to the mobile terminal 110 having the ID equaling "111111". The following is an example of the XML page 520:

<?xml version=" 1.0"?>
<SMS>
Today's weather: Party cloudy, low 10° C., high 15° C.
<OPTION ONDEFAULT=http://www.mobileinfo.com/default.asp>
</SMS>

After the XML page 520 is generated, the application server 150 generates a second HTTP response comprising the XML page 520 and any necessary cookies and outputs the HTTP response to the CTW converter 140 (step S450). Then, the CTW converter 140 converts the HTTP response into an SMS message in a manner that is similar to the manner described above (step S460), and the SMS message is output to the SMS center 130 (step S470). Afterwards, the SMS center 130 supplies the SMS message to the mobile terminal 110 (step S480), and the mobile terminal 110 displays the message as weather information 530 (step S490).

In a preferred embodiment, the CTW converter 140 utilizes a "read ahead" technique to enhance the speed at which the user can receive information via his or her mobile terminal 110. For example, in step S350, the CTW converter 140 receives the initial HTTP response containing the XML page 500 having the following ONPICK attributes:

http://www.mobileinfo.com/news.asp http://www.mobileinfo.com/weather.asp http://www.mobileinfo.com/stocks.asp http://www.mobileinfo.com/jokes.asp While the CTW converter 140 is converting the initial HTTP response into an SMS message to send to the mobile terminal 110, the converter 140 may concurrently send four more HTTP requests to the application server 150 requesting the server 150 to download the four XML pages relating to the four ONPICK attributes listed above. In one embodiment, the downloading of additional XML pages is performed if a specific attribute or parameter (e.g., a "cache" attribute) is specified or set in the OPTION tag for the four ONPICK attributes. As a result, when the user subsequently selects the "Weather" option from the menu 510 and an SMS message containing a "2" is output from the mobile terminal 110 to the CTW converter 140 (steps S400 and S410), the converter 140 has already received the HTTP responses containing the XML pages respectively relating to the news, weather, stocks, and jokes. Therefore, the CTW converter 140 can output the corresponding SMS message (i.e. the "Weather" SMS message) to the mobile terminal 110 very quickly, and thus, the mobile terminal 110 displays the weather information 530 much faster in response to the user's selection of the "Weather" option.

As described above, the CTW converter 140 quickly and easily converts the SMS or USSD protocols in an Internet protocol (e.g., the HTTP, XML, or HTML protocol) and vice versa. In addition, the Internet applications stored on the server 150 can be easily designed or modified so that they can communicate with the mobile terminals 110 via the CTW converter 140. Specifically, as indicated above, an existing application can be modified so that it can communicate with the mobile terminal 110 by amending the XML pages of the application to add OPTION tags containing various ONPICK and ONKEY attributes and to add various SMS message texts identified by SMS tags. Also, new applications can be easily designed to communicate with the mobile terminal by creating the appropriate XML pages having the above information. Since XMI pages can be easily created with existing Internet application software programs and design tools, programmers can easily and quickly create Internet applications that can communicate with mobile terminals utilizing the SMS or USSD protocols.

In light of the disclosure above, one skilled in the art will understand how to design and/or program the CTW converter 140 to convert proprietary protocols (e.g., the SMS and USSD protocols) into Internet protocols (e.g., the HTTP, XML, and HTML protocols) and vice-versa. Also, in order to further illustrate an example of the conversion method of the present invention, the following technical description the Unstructured Supplementary Service Markup Language ("USSML") protocol is provided. The USSML protocol is an XML dialect that has been developed by Comverse, Ltd. to enable third party developers to easily implement the USSD protocol using Internet tools. The USSML protocol contains tags that can represent a menu-based application residing on the Internet, and a developer of the application can easily modify a WML or an HTML application so that it can communicate with a mobile terminal that communicates in accordance with an SMS or USSD protocol.

The USSML protocol uses the <USSML> tag and the <OPTION> tag (as well as other tags). The <USSML> tag identifies all of the USSML settings and contents of the data transmitted in accordance with the USSML protocol and contains the "service" attribute. The "service" attribute identifies the general characteristic of a data message and can have one of the following values:
 *service="request"
 *service="notify"
 *service="sms"

When the "service" attribute has the * service="request" value (i.e. <USSML service=request>), the application sending the data message expects a response from a device or application to which the data message is sent. An example of such a data message is the XML page 500 shown in FIG. 7. When the "service" attribute has the * service="notify" value (i.e. <USSML service=notify>), the application sending the data message does not expect a response from the device or application. An example of such a data message may be a "welcome" screen that is displayed when a device is initially turned on. When the "service" attribute has the * service="SMS" value (i.e. <USSML service=SMS >), the data message contains an SMS message that is to be displayed on a mobile terminal 110. An example of such a data message is the XML page 520 shown in FIG. 7.

The <OPTION> tag defines which SMS messages may be received from a mobile terminal and which operations should be executed if one of the SMS messages is received. The <OPTION> tag contains an "acton" attribute, an "onpick" attribute, a "cache" attribute, and a "default" attribute.

The "acton" attribute specifies when the <OPTION> tag should be activated. For example, if the "acton" attribute equals "acton='1'", the <OPTION> tag containing such "acton" attribute will be executed if the mobile terminal outputs an SMS message containing a string that equals "1". Examples of the "acton" attribute are the ONKEY attributes discussed in conjunction with the above embodiments.

The "onpick" attribute specifies which URI is called when the <OPTION> tag is activated. For example, if the "acton" attribute equals "acton='1'" and the "onpick" attribute contains the URI "http://domain.com?thissession-1234", the URI "http://domain.com?thissession=1234" will be called if the mobile terminal outputs an SMS message that equals "1". Examples of the "onpick" attribute are the ONPICK attributes discussed in conjunction with the above embodiments.

The "cache" attribute specifies whether or not the URI identified in the "onpick" attribute should be read before a subsequent SMS message is received from the mobile terminal to activate the <OPTION> tag containing the "onpick" attribute. For example, if the "cache" attribute has a predetermined value, the system will perform the "read ahead" technique described above. For instance, assume that an initial SMS message output from the mobile terminal causes an application to output an HTTP response containing an XML page having the following "onpick" attributes (i.e. URIs):
 http://www.mobileinfo.com/subject1.asp
 http://www.mobileinfo.com/subject2.asp
 http://www.mobileinfo.com/subject3.asp
 http://www.mobileinfo.com/subject4.asp If the "cache" attribute has a predetermined value, the system will read all of the URIs listed above before the mobile terminal outputs a subsequent SMS message containing a string that equals the "acton" attribute associated with one of the above "onpick" attributes. Thus, when the subsequent SMS message is received from the mobile terminal, the corresponding URI has already been called, and the response time of the system is dramatically improved.

The "default" attribute specifies an <OPTION> tag that is activated if an SMS message is received that does not contain a string that equals the "acton" attribute of any other <OPTION> tag.

An example of the use of the USSML protocol will be described below. First, when a user activates his or her mobile terminal, a controller (e.g., the CTW converter 140) of the communication system activates a file "start.ussml", and such file automatically generates an HTTP request that calls the following URI:

http://operator.com/
   main.cgi?mobilenum=0788991122&answerstring=""
   &waitsecond s=2

Upon receiving the HTTP request, the relevant application generates an HTTP response that contains the following XML page:

<?xml version="1.0"?>
<USSML service=notify>
Welcome to Super Menu <BR/>
Sponsored by Comverse Tech. <BR/>
<OPTION default="1" ONPICK=http://operator.com/
   main.cgi?waitseconds=2/>
</USSML>
<?xml version="1.0"?>
<USSML service=request>
Hello Mr. Tom Arnold <BR/>
Please enter your choice <BR/>
<OPTION       onpick="http://operator.com/sport"
   acton="1">
1. Sports Result ~OPTION>
<OPTION       onpick="http://operator.com/stock"
   acton="2">
2. Stocks </OPTION>
<OPTION   onpick="http   ://operator.com/weather"
   acton="3">
3. Today's Weather <OPTION>
<OPTION onpick="http:operator.com/def" default="1">
</OPTION>
</USSML>

In response to the HTTP response, the controller causes the following message to be displayed on the display of the mobile terminal for two seconds:
   Welcome to Super Menu
   Sponsored by Comverse Tech.

Then, after two seconds pass, the following message is displayed on the mobile terminal:
   Hello Mr. Tom Arnold
   Please enter your choice
   1. Sports
   2. Stocks
   3. Today's Weather If the user instructs the mobile terminal to output an SMS message containing the string "2", the tag <OPTION onpick="http://operator.com/stock" acton="2">instructs the controller to generate an HTTP request that calls the following URI:
   "http://operator.com/stock"

In response to the HTTP request, the relevant application will generate an HTTP response containing the following XML page:

<?xml version="1.0"?>
<USSML service=request>
Please enter your stock's symbol <BR/>
<OPTION     onpick="http    ://operator.com/quote"
   default="1">
</OPTION>
</USSML>

As a result, the controller outputs an SMS message to the mobile terminal that causes the mobile terminal to display the following message:
   Please enter your stock's symbol If the user instructs the mobile terminal to outputs an SMS message containing a stock "ticker symbol" for a company (e.g., the ticker symbol "CMVT"), the tag <OPTION onpick="http ://operator.com/quote" default="1">instructs the controller to generate an HTTP request that calls the following URI.

http://operator.com/
   quote?mobilenum=0788991122&answerstring=CMVT"

In response to the HTTP request, the relevant application will generate an HTTP response containing the following XML page:

<?xml version="1.0"?>
<USSML service=sms>
CMVT: 1234$<BR/>
Change: +235%<
</USSML>

As a result, the controller outputs an SMS message to the mobile terminal that causes the mobile terminal to display the following message:
   CMVT: $1234
   Change: +235%

As described in the embodiments above, a mobile terminal 110 outputs mobile terminal messages (e.g., SMS or USSD) that are automatically translated into Internet requests (e.g., HTTP requests), and the Internet requests can access an Internet application running on a regular web server 155 or 175. Then, the web server 155 or 175 generates Internet responses (e.g., HTTP responses) based on the Internet requests, and the responses are translated back into mobile terminal messages. As a result, the present invention enables the user of the mobile terminal 110, which uses an SMS or USSD protocol, to access various Internet applications, which can be easily created or adapted to communicate with mobile terminal 110.

For example, the present invention enables an application developer to simply and easily create an application in a web server 155 or 175 that can be accessed by SMS or USSD terminals, without requiring the developer to spend the substantial resources needed to specifically design the application to interact with SMS or USSD terminals. In other words, applications can be accessed by SMS or USSD mobile terminals without having to specifically design or implement the applications via the complex SMS or USSD protocols.

In addition, the CTW converter 140 described above is clearly not limited to translating SMS or USSD protocols into an HTTP protocol and vice versa. For example, the converter 140 may translate SMPP, UCP, CIMD, or NIP protocols to the HTTP protocol and vice versa. Also, the converter may translate other telephone protocols to other Internet protocols and vice versa.

Also, the messages sent from and received by the mobile terminal 110 may be transferred over various cellular systems now in use. For example, the messages may be transferred over the GSM, Advanced Mobile Phone Service ("AMPS"), IS-54, IS-95, or IS-136 system. Messages may also be transferred over future systems, based on the 2.5G or 3G standards. The 2.5G standard, in all its variations (e.g., the General Packet Radio Service ("GPRS") or EDGE variation), is currently being implemented in world markets. Also, the 3G standard will be implemented in Japan later this year, in Europe in the year 2001, and in the United States in the year 2002. Thus, a preferred embodiment of the present invention will be able to operate in accordance with all the standards mentioned above. In addition, the various cellular systems over which the invention will operate may use all the various modulation schemes, such as Frequency Division Muliple Access ("FDMA"), TDMA, CDMA, or any combination thereof, to transmit the messages. Furthermore, the present invention may support various devices and services that operate in a half-duplex mode and devices that operation in a full-duplex mode in any of its variations (e.g., a Frequency Division Duplex ("FDD") variation, a Time Division Duplex ("TDD") variation, a Code Division Duplex ("CDD") variation) or any combination of such variations.

In addition, as described above, the CTW converter 140 can support normal web server "sessions" by accepting "cookies" from a web server 155 or 175 and storing them in accordance with an ID (e.g., a mobile telephone number) of the mobile telephone 110 accessing the server 155 or 175. Thus, the next request from the same mobile telephone 110 will access the web server 155 or 175 with an HTTP request that provides the server 155 or 175 with the stored cookie. As a result, the application running on the server 155 or 175 immediately resumes executing in the context of the session with the specific mobile terminal 110 that sent the previous HTTP request. Consequently, the mobile terminal 110 can communicate with the web server 155 or 175 in the exact same manner as a desktop browser communicates with the web server 155 or 175.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed:

1. A communication system, comprising:
    a protocol converting controller that receives a first upstream mobile terminal message having a mobile terminal communication protocol and converts the first upstream mobile terminal message into a first upstream Internet message having an Internet protocol,
    wherein the protocol converting controller receives the first upstream mobile terminal message, selects a first upstream Internet address corresponding to the first upstream mobile terminal message, and generates the first upstream Internet message based on the first upstream Internet address,
    wherein the first upstream Internet message is supplied to an Internet application,
    wherein the protocol converting controller determines if the first upstream mobile terminal message is part of an existing session with the Internet application,
    wherein, when the first upstream mobile terminal message is part of the existing session, the protocol converting controller selects a first selected Internet address as the first upstream Internet address, and
    wherein, when the first upstream mobile terminal message is not part of the existing session, the protocol converting controller selects a second selected Internet address as the first upstream Internet address.

2. The communication system as claimed in claim 1, wherein a first downstream Internet message comprises the first selected Internet address, first downstream data corresponding to a first downstream mobile terminal message, and a first responsive mobile terminal message that is associated with the first selected Internet address,
    wherein the first downstream Internet message is supplied to the protocol converting controller and the protocol converting controller generates the first downstream mobile terminal message based on the first downstream data,
    wherein the first upstream mobile terminal message is supplied to the protocol converting controller in response to the first downstream mobile terminal message, and
    wherein the protocol converting controller determines that the first upstream mobile terminal message is part of the existing session with the Internet application when the first upstream mobile terminal message corresponds to the first responsive mobile terminal message.

3. The communication system as claimed in claim 2, wherein the first downstream Internet message further comprises a first downstream identification corresponding to a destination of the first downstream mobile terminal message and a first downstream destination address of the Internet application,
    wherein the protocol converting controller receives the first upstream mobile terminal message, a first upstream identification corresponding to a source of the first upstream mobile terminal message, and a first upstream destination address corresponding to the first upstream mobile terminal message, and
    wherein the protocol converting controller determines that the first upstream mobile terminal message is part of the existing session with the Internet application when the first upstream mobile terminal message corresponds to the first responsive mobile terminal message, the first upstream identification corresponds to the first downstream identification, and the first upstream destination address corresponds to the first downstream destination address.

4. The communication system as claimed in claim 3, wherein, when the protocol converting controller determines that the first upstream mobile terminal message is not part of the existing session with the Internet application, the protocol converting controller selects the second selected Internet address based on the first upstream destination address.

5. The communication system as claimed in claim 2, wherein, if the first downstream Internet message further comprises a cache parameter, the protocol converting controller generates a second upstream Internet message based on the first selected Internet address before the protocol converting controller receives the first upstream mobile terminal message,
    wherein the protocol converting controller receives a second downstream Internet message corresponding to the second upstream Internet message,
    wherein the second downstream Internet message comprises second downstream data corresponding to a second downstream mobile terminal message,
    wherein, when the protocol converting controller receives the first upstream mobile terminal message, the protocol converting controller determines if the second downstream mobile terminal message is responsive to the first upstream mobile terminal message, and wherein, when the second downstream mobile terminal message is responsive to the first upstream mobile terminal message, the protocol converting controller outputs the second downstream mobile terminal message.

6. The communication system as claimed in claim 1, wherein the first upstream mobile terminal message comprises a destination address, which corresponds to the mobile terminal communication protocol, and
wherein the protocol converting controller selects the first upstream Internet address corresponding to the destination address of first upstream mobile terminal message.

7. A communication system, comprising:
a protocol converting controller that receives a first upstream mobile terminal message having a mobile terminal communication protocol and converts the first upstream mobile terminal message into a first upstream Internet message having an Internet protocol,
wherein the protocol converting controller receives a first downstream Internet message from an Internet application before receiving the first upstream mobile terminal message,
wherein the first downstream Internet message comprises a first downstream cookie,
wherein the protocol converting controller determines if the Internet application requires the first downstream cookie to appropriately process the first upstream Internet message,
wherein, when the first downstream cookie is required to appropriately process the first upstream Internet message, the protocol converting controller outputs the first downstream cookie as a first upstream cookie, along with the first upstream Internet message.

8. The communication system as claimed in claim 7, wherein the first downstream Internet message further comprises a first downstream identification and a first downstream Internet address, and
wherein the protocol converting controller determines that the Internet application requires the first downstream cookie to appropriately process the first upstream Internet message if a first upstream identification and a first upstream Internet address corresponding to the first upstream Internet message respectively correspond to the first downstream identification and the first downstream Internet address.

9. The communication system as claimed in claim 7, wherein the first upstream mobile terminal message comprises a destination address, which corresponds to the mobile terminal communication protocol,
wherein the protocol converting controller receives the first upstream mobile terminal message, selects a first upstream Internet address corresponding to the destination address of the first upstream mobile terminal message, and generates the first upstream Internet message based on the first upstream Internet address.

10. A communication system, comprising:
a protocol converting controller that receives a first downstream Internet message having an Internet protocol and converts the first downstream Internet message into a first downstream mobile terminal message having a mobile terminal communication protocol,
wherein the first downstream Internet message comprises an Internet data page having:
first downstream mobile terminal message data that is used to generate the first downstream mobile terminal message;
first responsive mobile terminal message data corresponding to a first responsive upstream mobile terminal message that responds to the first downstream mobile terminal message; and
a first Internet address that corresponds to the first responsive upstream mobile terminal message,
wherein the protocol converting controller generates the first downstream mobile terminal message based on the first downstream mobile terminal message data and outputs the first downstream mobile terminal message.

11. The communication system as claimed in claim 10, wherein the mobile terminal communication protocol is one of an SMS protocol and a USSD protocol.

12. The communication system as claimed in claim 10, wherein the Internet protocol is one of an HTTP protocol and an XML protocol.

13. The communication system as claimed in claim 10, wherein the protocol converting controller receives a first upstream mobile terminal message having the mobile terminal communication protocol and determines if the first upstream mobile terminal message corresponds to the first responsive upstream mobile terminal message,
wherein, when the first upstream mobile terminal message corresponds to the first responsive upstream mobile terminal message, the protocol converting controller generates a first upstream Internet message having the Internet protocol, and
wherein the first upstream Internet message comprises the first Internet address.

14. The communication system as claimed in claim 13, wherein the protocol converting controller receives the first downstream Internet message from an Internet application,
wherein the first downstream Internet message further comprises a first downstream cookie,
wherein the protocol converting controller determines if the Internet application requires the first downstream cookie to appropriately process the first upstream Internet message,
wherein, when the first downstream cookie is required to appropriately process the first upstream Internet message, the protocol converting controller outputs the first downstream cookie as a first upstream cookie, along with the first upstream Internet message.

15. A communication system, comprising:
an Internet server that receives a first upstream Internet message having an Internet protocol, wherein the first upstream Internet message is based on a first upstream mobile terminal message having a mobile terminal communication protocol,
wherein the Internet server contains an Internet application that generates a first downstream Internet message based on the first upstream Internet message,
wherein the first downstream Internet message comprises an Internet data page having:
first downstream mobile terminal message data that is used to generate a first downstream mobile terminal message that responds to the first upstream mobile terminal message;
first responsive mobile terminal message data corresponding to a first responsive upstream mobile terminal message that responds to the first downstream mobile terminal message; and
a first Internet address that corresponds to the first responsive upstream mobile terminal message.

16. The communication system as claimed in claim 15, wherein the mobile terminal communication protocol is one of an SMS protocol and a USSD protocol.

17. The communication system as claimed in claim 15, wherein the Internet protocol is one of an HTTP protocol and an XML protocol.

18. The communication system as claimed in claim 15, wherein the first downstream Internet message further comprises a first downstream cookie that is required for a second upstream Internet message to be appropriately processed by the Internet application, and
wherein the second upstream Internet message corresponds to the first responsive upstream mobile terminal message.

19. A communication method, comprising:
(a) receiving a first upstream mobile terminal message having a mobile terminal communication protocol, wherein the first upstream mobile terminal message comprises a destination address, which corresponds to the mobile terminal communication protocol; and
(b) converting the first upstream mobile terminal message into a first upstream Internet message having an Internet protocol;
wherein the operation (b) comprises:
(b1) selecting a first upstream Internet address corresponding to the destination address of the first upstream mobile terminal message; and
(b2) generating the first upstream Internet message based on the first upstream Internet address,
wherein the first upstream Internet message is supplied to an Internet application, and
wherein the operation (b1) comprises:
(b1a) determining if the first upstream mobile terminal message is part of an existing session with the Internet application;
(b1b) when the first upstream mobile terminal message is part of the existing session, selecting a first selected Internet address as the first upstream Internet address; and
(b1c) when the first upstream mobile terminal message is not part of the existing session, selecting a second selected Internet address as the first upstream Internet address.

20. The method as claimed in claim 19, further comprising:
(c) receiving a first downstream Internet message comprising the first selected Internet address, first downstream data corresponding to a first downstream mobile terminal message, and a first responsive mobile terminal message that is associated with the first selected Internet address;
(d) generating the first downstream mobile terminal message based on the first downstream data; and
(e) generating the first upstream mobile terminal message in response to the first downstream mobile terminal message, and
wherein the operation (b1a) comprises:
(b1a1) determining that the first upstream mobile terminal message is part of the existing session with the Internet application when the first upstream mobile terminal message corresponds to the first responsive mobile terminal message.

21. The method as claimed in claim 20, wherein the first downstream Internet message further comprises a first downstream identification corresponding to a destination of the first downstream mobile terminal message and a first downstream destination address of the Internet application,
wherein the operation (a) comprises:
(a1) receiving a first upstream identification corresponding to a source of the first upstream mobile terminal message and a first upstream destination address corresponding to the first upstream mobile terminal message, and
wherein the operation (b1a1) comprises:
(b1a1a) determining that the first upstream mobile terminal message is part of the existing session with the Internet application when the first upstream mobile terminal message corresponds to the first responsive mobile terminal message, the first upstream identification corresponds to the first downstream identification, and the first upstream destination address corresponds to the first downstream destination address.

22. The method as claimed in claim 21, wherein operation (b1c) comprises:
(b1c1) when the first upstream mobile terminal message is not part of the existing session with the Internet application, selecting the second selected Internet address based on the first upstream destination address.

23. The method as claimed in claim 20, further comprising:
(f) determining if the first downstream Internet message further comprises a cache parameter;
(g) when the first downstream Internet message comprises the cache parameter, generating a second upstream Internet message based on the first selected Internet address before receiving the first upstream mobile terminal message;
(h) receiving a second downstream Internet message corresponding to the second upstream Internet message, wherein the second downstream Internet message comprises second downstream data corresponding to a second downstream mobile terminal message;
(i) when the first upstream mobile terminal message is received, determining if the second downstream mobile terminal message is responsive to the first upstream mobile terminal message; and
(j) when the second downstream mobile terminal message is responsive to the first upstream mobile terminal message, outputting the second downstream mobile terminal message.

24. A communication method comprising:
(a) receiving a first upstream mobile terminal message having a mobile terminal communication protocol; and
(b) converting the first upstream mobile terminal message into a first upstream Internet message having an Internet protocol;
(c) receiving a first downstream Internet message from an Internet application before receiving the first upstream mobile terminal message, wherein the first downstream Internet message comprises a first downstream cookie;
(d) determining if the Internet application requires the first downstream cookie to appropriately process the first upstream Internet message; and
(e) when the first downstream cookie is required to appropriately process the first upstream Internet message, outputting the first downstream cookie as a first upstream cookie, along with the first upstream Internet message.

25. The method as claimed in claim 24, wherein the first downstream Internet message further comprises a first downstream identification and a first downstream Internet address, and
wherein the operation (d) comprises:
(d1) determining that the Internet application requires the first downstream cookie to appropriately process the first upstream Internet message if a first upstream identification and a first upstream Internet address corresponding to the first upstream Internet message respectively correspond to the first downstream identification and the first downstream Internet address.

26. The communication method as claimed in claim 24, wherein the first upstream mobile terminal message comprises a destination address, which corresponds to the mobile terminal communication protocol, and
  wherein the operation (b) comprises:
    (b1) selecting a first upstream Internet address corresponding to the destination address of the first upstream mobile terminal message; and
    (b2) generating the first upstream Internet message based on the first upstream Internet address,
  wherein the first upstream Internet message is supplied to an Internet application.

27. A software program contained in a computer readable medium, wherein the software program instructs a communication system to perform a routine, comprising:
  (a) receiving a first upstream Internet message having an Internet protocol, wherein the first upstream Internet message is based on a first upstream mobile terminal message having a mobile terminal communication protocol,
  (b) generating a first downstream Internet message based on the first upstream Internet message, wherein the first downstream Internet message comprises an Internet data page having:
  first downstream mobile terminal message data that is used to generate a first downstream mobile terminal message that responds to the first upstream mobile terminal message;
  first responsive mobile terminal message data corresponding to a first responsive upstream mobile terminal message that responds to the first downstream mobile terminal message; and
  a first responsive Internet address that corresponds to the first responsive upstream mobile terminal message.

28. The software program as claimed in claim 27, wherein the mobile terminal communication protocol is one of an SMS protocol and a USSD protocol.

29. The software program as claimed in claim 27, wherein the Internet protocol is an HTTP protocol and an XML protocol.

30. The software program as claimed in claim 27, wherein the first downstream Internet message further comprises a first downstream cookie that is required for a second upstream Internet message to be appropriately processed, and
  wherein the second upstream Internet message corresponds to the first responsive upstream mobile terminal message.

31. The software program as claimed in claim 27, further comprising:
  (c) receiving the first upstream mobile terminal message, wherein the first upstream mobile terminal message comprises a destination address which corresponds to the mobile terminal communication protocol;
  (d) converting the first upstream mobile terminal message into the first upstream Internet message;
  wherein the operation (d) comprises:
    (d1) selecting a first upstream Internet address corresponding to the destination address of the first upstream mobile terminal message; and
    (d2) generating the first upstream Internet message based on the first upstream Internet address, and
  wherein the first upstream Internet message is supplied to an Internet application.

* * * * *